United States Patent [19]
Glasser et al.

[11] Patent Number: 5,900,479
[45] Date of Patent: May 4, 1999

[54] CHITIN-BASED COATINGS

[75] Inventors: Wolfgang G. Glasser; Gamini Samaranayake; Ackah Toffey, all of Blacksburg, Va.

[73] Assignee: Virginia Tech Intellectual Properties, Inc., Blacksburg, Va.

[21] Appl. No.: 08/435,866

[22] Filed: May 5, 1995

[51] Int. Cl.⁶ .................................................. C08B 37/08
[52] U.S. Cl. ............................................. 536/20; 536/124
[58] Field of Search ....................... 536/20, 124

[56] References Cited

U.S. PATENT DOCUMENTS

| | | |
|---|---|---|
| 2,217,823 | 10/1940 | Thor . |
| 3,948,823 | 4/1976 | Lee et al. . |
| 3,962,158 | 6/1976 | Mima et al. ............................. 524/29 |
| 4,029,727 | 6/1977 | Austin . |
| 4,309,534 | 1/1982 | Austin . |
| 4,929,722 | 5/1990 | Partain, III et al. .................... 536/20 |
| 5,021,207 | 6/1991 | DeLucca et al. . |
| 5,114,788 | 5/1992 | Nakagawa et al. .................... 428/284 |
| 5,283,064 | 2/1994 | Suzuki et al. . |
| 5,306,550 | 4/1994 | Nishiyama et al. .................... 428/288 |

FOREIGN PATENT DOCUMENTS 458813  12/1936  United Kingdom .

OTHER PUBLICATIONS

Karrer et al., Translation of Helvitica Chimica Acta 13, pp. 1105–1113, 1930.
Isogai et al., *Carb. Poly.,* 19:25–28 1992.
Hosokawa et al., *Ind. Eng. Chem. Res.,* 29:800–805 1990.
Hosokawa et al., *Ind. Eng. Chem. Res.,* 30:788–792 1991.
Hasegawa et al., *J. Appl. Poly. Sci.* 45:1873–1879 1992.
Hirano et al., *Science News* vol. 144 p. 74.

*Primary Examiner*—Jeffrey C. Mullis
*Attorney, Agent, or Firm*—Whitham, Curtis & Whitham

[57] ABSTRACT

A chitosan starting material is combined with a dilute organic acid to produce a chitosonium ion complex. The chitosonium ion complex is then cast, sprayed, extruded, or otherwise processed to produce filaments, coatings, fibers, or the like. Heat is then used to convert the chitosonium ion complex into a $N\text{-}(C_{1-30})$acyl glucose amine polymer.

3 Claims, No Drawings

CHITIN-BASED COATINGS

BACKGROUND OF THE INVENTION

1. Field of the Invention

The invention is generally related to a low-cost, safe, and effective method for forming crack-free, conformal coatings and/or fibers of chitin.

2. Description of the Prior Art

Chitin is an unbranched $\beta(1\rightarrow4)$ linked polymer of 2-acetamido-2-deoxy-D-glucose (N-acetyl-D-glucosamine) and has the following chemical structure:

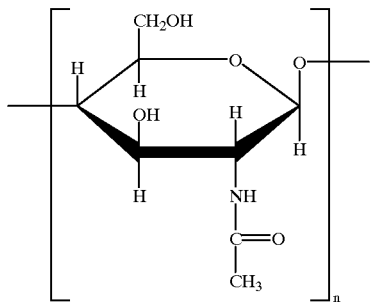

Chitin is a material used principally by insects and marine animals for structural purposes. Chitin is typically obtained from marine waste products such as the shells of crab, shrimp, prawn, and krill, but can be obtained from a wide variety of other sources including arthropod exoskeletons and the cell walls of different forms of fungi. Chitin is insoluble in water and most commonly used solvents. The insolubility of chitin makes it difficult to process and makes formation of fibers, films, and other products therefrom problematical using prior art processing methodologies.

Consequently, more common is the reshaping and regenerating of chitosan, the acid-soluble deacetylation product of chitin. Chitosan regeneration always involves treatment with alkali so as to neutralize carboxylic acid anions, and this produces chitosan which continues to be soluble in mild acids. Chitin, by contrast, is insoluble in all common solvents, with the exception of dimethyl acetamide anhydrous ca. 8% lithium chloride, DMAc/LiCl.

U.S. Pat. No. 2,217,823 to Thor discloses a chitin processing methodology for producing articles such as filaments, films, tubes, ribbons, threads, and the like. In essence, Thor describes a methodology whereby chitin is first converted to a chitin xanthate using a caustic alkali solution and carbon disulfide. The chitin xanthate is a viscous dispersion that is subsequently processed by extrusion into a coagulating bath, such as sulphuric acid and ammonium sulphate. The chitin is regenerated in the coagulating bath and assumes a gel-like consistency. The articles are then produced by various drying operations. Thor also makes provisions for combining chitin and cellulose materials. However, the Thor methodology suffers from several drawbacks. First, caustic alkali solutions and carbon disulfide must be utilized, and this presents severe environmental, health and safety problems and increases the cost of processing vessels which must withstand the harsh environment. Second, the treatment of chitin with alkali promotes the partial conversion of chitin to chitosan, which becomes soluble in dilute acid if sufficiently deacetylated. Third, the Thor process requires the application of dissolution, filtration and regeneration technology that is being abandoned by the rayon fiber industry for environmental reasons and reasons of process complexity. This makes it improbable that the fabrication of suitable chitin articles by the xanthate method will be practical on an industrial scale.

U.S. Pat. No. 4,029,727 to Austin describes the formation of high strength chitin films and fibers in a four step process. First, chitin is dissolved with a blend of dichloroacetic acid and an anhydrous organic solvent. Second, chitin is coagulated using an excess amount of an organic liquid that is a non-solvent for chitin. Third, the coagulated article is neutralized with an alkaline reagent. This may again promote chitin deacetylation with formation of acid-soluble chitosan if conditions are sufficiently harsh. Fourth, cold drawing is used to orient the chitin fibrils. The Austin methodology is not environmentally sound since it requires the use of organic reagents which present disposal and other problems. In addition, like Thor, Austin requires multiple reagents to be used in the methodology.

U.S. Pat. No. 5,021,207 to DeLucca et al. discloses the formation of chitin acetate fibers. DeLucca is similar to U.S. Pat. No. 4,029,727 to Austin in that organic liquids are utilized to dissolve or disperse the chitin, to enable processing.

Chitosan is the product of deacetylation of chitin. It is an amorphous solid which is more soluble in water, having a pH below 6, than chitin, but it usually requires the use of aqueous organic acids to attain solubility. Chitosan is of nearly identical structure to chitin, except that it is de-acetylated. The chemical structure of chitosan is as follows:

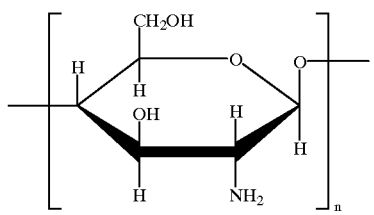

Because chitosan is more easily solubilized and processable, a great deal of researchers and industrialists have experimented with and/or used chitosan coatings in a wide variety of applications.

U.S. Pat. No. 4,309,534 to Austin describes a process for preparing renatured chitosan having particular optical rotation characteristics. Chitosan is aged in aqueous acid for a period of weeks. During this time period a chitosan partial acetate is formed, and the salt slowly loses the acetic acid during aging. Thereafter, the chitosan/partially deacetylated chitin is poured out as a film and immersed in dilute base, such as sodium bicarbonate, to neutralize the acetic acid and regenerate the chitosan film as the free base.

U.S. Pat. No. 5,283,064 to Suzuki et al. dislcoses the formation of chitosan coatings on medicament capsules. Chitosan is dissolved in acetic acid and is applied to medicament in a mold. The acetic acid is neutralized by inserting the mold in dilute sodium hydroxide. The neutralization step regenerates the chitosan film, and the film is subsequently dried.

Various researchers have discussed blending chitosan with cellulose to produce biodegradable films (See, for example, Isogai et al., *Carb. Poly.*, 19:25–28 (1992), Hosokawa et al., *Ind. Eng. Chem. Res.* 29:800–805 (1990), Hosokawa et al., *Ind. Eng. Chem. Res.* 30:788–792 (1991), and Hasegawa et al., *J. Appl. Poly. Sci.* 45:1873–1879 (1992)).

Chitosan films are not advantageously employed in many circumstances. Unlike chitin, chitosan is a soluble entity (e.g., it can be solubilized in mild acids, especially acetic and other carboxylic acids, but also to a limited extent in HCl and $HNO_3$, if the pH is maintained at about 4.0–6.0. Chitosan is not soluble at pHs above 7.0). Thus, the integrity of chitosan films and fibers is more easily compromised. What is needed is an improved method for preparing chitin films and fibers. The possible applications of chitin films and fibers are almost limitless.

As is discussed in Hirano et al., *Science News* Vol.144 page 74, chitin may have applications in chromatography, photosensitive materials, biomedical fibers and films, immunoadhesives, drug carrier and delivery mechanisms, dopants in dyes, and in antithrombogenic materials.

SUMMARY OF THE INVENTION

It is an object of this invention to provide a low cost, uncomplicated, safe and effective method for preparing chitin films and fibers.

According to the invention, a chitosan starting material is combined with a dilute organic acid, such as formic acid or acetic acid. Interaction of the chitosan starting material and organic acid yields a chitosonium ion complex. In the case where formic acid or acetic acid is used, the formate and acetate anions serve as counter-ions to the chitosonium cation. The chitosonium ion complex is water soluble, has no odor or toxicity, and requires no special handling procedures. The chitosonium ion complex is castable to form films or extrudable to form fibers and filaments. After casting or film formation, the chitosonium ion complex is subjected to mild heating conditions to produce an N-acyl glucose amine polymer. In the preferred case where acetic acid is used to form the chitosonium ion complex, chitin is formed. The films and fibers which are formed are completely water insoluble, strong and tough materials that are completely non-toxic, and biodegradable.

DETAILED DESCRIPTION OF THE PREFERRED EMBODIMENTS OF THE INVENTION

Chitosan is commercially available from a wide variety of sources including VANSON of Redmond, Wash., and Protan of Woodinville, Wash. The chitosan starting material can theoretically be substituted or unsubsituted at the ring hydroxy moiety or the hydroxy methyl moiety. The important feature is that the chitosan has a majority of free, primary amine groups along its polymeric backbone to form ionic complexes with dilute organic acids. Preferably the chitosan has an average molecular weight ranging from $10^4$ to $10^6$; however, the molecular weight may vary considerably depending on the properties of the film or fiber product desired. The chitosan starting material has the following chemical formula:

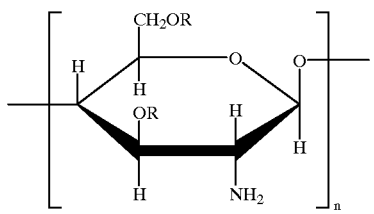

where n is greater than 3, and R is hydrogen or a one to twelve carbon ($C_{1-12}$) ether or ester.

The chitosan starting material is first combined with a dilute organic acid. The organic acid will preferably have 1–30 carbon atoms in a branched or unbranched structure. In the preferred case where chitin films and fibers are to be formed, the dilute organic acid will be acetic acid. Preferably, the concentration of the acetic acid ranges from 1 to 10%. The objective of the inventive method is to add the acid moiety to the chitosan starting material at the primary amine. Satisfactory results have been achieved with formic acid and acetic acid, however, other $C_{1-30}$ mono-, di-, or tribasic organic acids which produce polyanionic base soluble polymers could also be used. Examples of mono-, di- or tribasic organic acids include acetic, adipic, citric, formic, lactic, malic, malonic, oxalic, propionic, pyruvic, succinic, and tartaric acid. The final product for this method will be a N-($C_{1-30}$)acyl glucose amine polymer depending upon the organic acid used.

Preferably, the organic acid is present in the combination with the chitosan starting material in a molar excess quantity. This will allow the organic acid to combine with all available free amine groups on the chitosan starting material. In the case of acetic acid, the excess quantity creates a vinegary odor, but is not harmful. However, if less substitution along the chitosan backbone is desired, the amount of organic acid added to the combination could be non-stoichiometric.

While the chitosan starting material and organic acid are together, they interact at the primary amine to produce a chitosonium ion complex. For example, in the case of acetic acid being combined with chitosan, chitosonium acetate is formed. The chitosonium ion complex is water soluble and behaves in a manner similar to a gum or ionic starch. The chitosonium ion complex can be extruded to form films, fibers, filaments, or the like, or it can be injection molded to form a variety of articles, or it can be sprayed or otherwise applied as a coating. Any procedure for applying the chitosonium ion complex to the surface of an article could be used in the practice of this invention. The viscosity of the chitosonium ion complex can be adjusted by allowing a controlled amount of evaporation to occur. The viscosity desired will depend upon the application technique to be employed.

After coating an article, forming a filament, or the like, with the chitosonium ion complex, heat is applied to convert the ammonium organic acid ionic groups to N-organic acid groups. For example, in the case of forming chitin films, ammonium acetate groups at the primary amines are converted to chitin N-acetyl groups. The heating conditions are preferably mild (e.g., 100° C.–130° C.) and are used to drive off water ("amidation" or "polyanionic polymer condensation"). A weight loss amounting to approximately 8% occurs during heating, and this is the result of the release of one molecule of water per anhydroglucose amine repeat unit. Production of the N acyl chitosan (e.g., chitin) can be promoted by performing the polyanionic polymer condensation in the presence of a catalyst. The catalysts useful for the chitosan-to-chitin conversion reaction include inorganic compounds (e.g., Lewis acids) such as aluminum oxide, ferric oxide, calcium oxide, silica, and sulfur trioxide, and organic compounds such as dicyclohexyl carbodiimide (DCC), and 1-(3-dimethylaminopropyl)-3-ethyl carbodiimide hydrochloride (ECDI). The above noted catalysts all serve to remove water and will preferably be used in equimolar amounts to water removal. In this sense, the catalysts are not truly "catalytic", however, they are identified as being useful in promoting the reaction. It should be understood that the addition of any catalyst may pose problems with side reactions and with removal of the catalyst from the finished product.

Fourier transform infrared spectrometry, solid state $^{13}$C-NMR spectroscopy, and thermogravimetric analysis thermograms have demonstrated that the product of chitosan converted to chitosonium acetate followed by heating according to the above-described procedure is chitin. Hence, the procedure offers a low cost, safe and effective method for regenerating chitin from chitosan, and for forming chitin films, filaments, fibers, and the like, which are water insoluble, biodegradable, non-toxic and chemically indistinguishable from chitin. Films, filaments, fibers, and the like, of other N-acyl glucose amine polymers can also be formed using the inventive procedure.

While the invention has been described in terms of its preferred embodiments, those skilled in the art will recognize that the invention can be practiced with modification within the spirit and scope of the appended claims.

We claim:

1. A method of preparing water insoluble, unbranched N-($C_{1-30}$) acyl glucose amine polymers, comprising the steps of:

forming an intermediate product consisting essentially of chitosonium ion complex by a procedure consisting essentially of combining a chitosan material with a sufficient amount of a $C_{1-30}$ mono-, di-, or tribasic organic acid to form said chitosonium ion complex;

extruding said chitosonium ion complex to provide a shaped article; and heating said shaped article to a temperature sufficient to drive off water and produce a water insoluble product consisting essentially of an unbranched N-($C_{1-30}$)acyl glucose amine polymer.

2. The method of claim 1 wherein said shaped article is selected from the group consisting of a film, a filament, and a fiber.

3. A method of preparing water insoluble, unbranched N-($C_{1-30}$) acyl glucose amine polymers, comprising the steps of:

forming an intermediate product consisting essentially of chitosonium ion complex by a procedure consisting essentially of combining a chitosan material with a sufficient amount of a $C_{1-30}$ mono-, di-, or tribasic organic acid to form said chitosonium ion complex;

injection molding said chitosonium ion complex to provide a shaped article; and heating said shaped article to a temperature sufficient to drive off water and produce a water insoluble product consisting essentially of an unbranched N-($C_{1-30}$)acyl glucose amine polymer.

* * * * *